United States Patent
Schleicher, II et al.

(10) Patent No.: US 7,275,232 B2
(45) Date of Patent: Sep. 25, 2007

(54) METHODS FOR PRODUCING EQUIVALENT FIELD-PROGRAMMABLE GATE ARRAYS AND STRUCTURED APPLICATION SPECIFIC INTEGRATED CIRCUITS

(75) Inventors: James G. Schleicher, II, Los Gatos, CA (US); David Karchmer, Los Altos, CA (US)

(73) Assignee: Altera Corporation, San Jose, CA (US)

( * ) Notice: Subject to any disclaimer, the term of this patent is extended or adjusted under 35 U.S.C. 154(b) by 55 days.

(21) Appl. No.: 11/097,633

(22) Filed: Apr. 1, 2005

(65) Prior Publication Data
US 2006/0225008 A1    Oct. 5, 2006

(51) Int. Cl.
G06F 17/50 (2006.01)
H03K 17/693 (2006.01)

(52) U.S. Cl. ........................................................ 716/16
(58) Field of Classification Search ............... 716/3–5, 716/16
See application file for complete search history.

(56) References Cited

U.S. PATENT DOCUMENTS

| | | | |
|---|---|---|---|
| 5,043,870 A * | 8/1991 | Ditzel et al. | 711/132 |
| 5,815,405 A * | 9/1998 | Baxter | 716/3 |
| 5,825,202 A | 10/1998 | Tavana et al. | |
| 5,874,834 A | 2/1999 | New | |
| 6,091,262 A | 7/2000 | New | |
| 6,094,065 A | 7/2000 | Tavana et al. | |
| 6,195,786 B1 * | 2/2001 | Raghunathan et al. | 716/2 |
| 6,209,119 B1 * | 3/2001 | Fukui | 716/2 |
| 6,233,599 B1 * | 5/2001 | Nation et al. | 718/102 |
| 6,242,945 B1 | 6/2001 | New | |
| 6,490,707 B1 | 12/2002 | Baxter | |
| 6,515,509 B1 | 2/2003 | Baxter | |
| 6,526,563 B1 | 2/2003 | Baxter | |
| 6,625,787 B1 * | 9/2003 | Baxter et al. | 716/6 |
| 6,691,286 B1 * | 2/2004 | McElvain et al. | 716/3 |
| 7,038,490 B1 * | 5/2006 | Singh et al. | 326/41 |
| 2004/0111691 A1 | 6/2004 | Tan et al. | |
| 2004/0261052 A1 | 12/2004 | Perry et al. | |
| 2005/0149896 A1 * | 7/2005 | Madurawe | 716/17 |
| 2005/0280438 A1 * | 12/2005 | Park | 326/41 |

OTHER PUBLICATIONS

"LCELL WYSIWYG Description for the Stratix II Family", Version 1.1, Altera Corporation, Mar. 22, 2004.
A. Bismuth, "Bridge Between FPGAs and Standard-Cell ASICs; Structured ASICs Minimize Design Risks, Reduce Development Costs, and Shorten Time-To-Market," Elektronik Weka-Fachzeitschriften Germany, vol. 54, No. 3, pp. 46-50, Feb. 8, 2005 (original German and English translation are provided herewith).
"Quartus II Software Release Notes" [Online], pp. 1-42, Jan. 2004.

* cited by examiner

*Primary Examiner*—Paul Dinh
*Assistant Examiner*—Suresh Memula
(74) *Attorney, Agent, or Firm*—Fish & Neave IP Group of Ropes & Gray LLP; Robert R. Jackson

(57) ABSTRACT

Compiler flows are provided that can produce functionally equivalent field programmable gate arrays ("FPGAs") and structured application-specific integrated circuits ("structured ASICs"). The flows may include feeding back design transformations that are performed during either flow so that a later performance of the other flow will necessarily include the same transformations, thereby helping to ensure functional equivalence. The flows may include a comparison of intermediate results in order to prove that functional equivalence is being achieved.

12 Claims, 13 Drawing Sheets

METHODS FOR PRODUCING EQUIVALENT FIELD-PROGRAMMABLE GATE ARRAYS AND STRUCTURED APPLICATION SPECIFIC INTEGRATED CIRCUITS

BACKGROUND OF THE INVENTION

This invention relates to application-specific integrated circuits ("ASICs"), and more particularly to the type of ASICs that are sometimes known as structured ASICs.

So-called structured ASICs are sometimes used as alternatives to programmable logic devices ("PLDs") such as field-programmable gate arrays ("FPGAs"). An FPGA has a generic structure that may include many identical blocks of logic circuitry, many registers, and a number of other types of circuit blocks such as I/O blocks, RAM blocks, DSP blocks, PLL/DLL blocks, etc. These various circuitries are programmable to perform any of a variety of tasks. An FPGA also has a generic interconnection structure. This structure is programmable to interconnect the other circuitries on the device in any of many different ways. The logic blocks of such an FPGA may be referred to as logic elements, logic modules, adaptive logic elements, or adaptive logic modules ("LEs", "LMs", "ALEs", or "ALMs").

A known type of structured ASIC equivalent to an FPGA has a generic structure that includes many identical instances of a relatively simple circuit block (a so-called hybrid logic element or "HLE"). The structured ASIC may also generically include other blocks that are comparable to the special-purpose blocks on a related FPGA (e.g., I/O blocks, RAM blocks, PLL/DLL blocks, etc.). These generic attributes of the structured ASIC are embodied (at least to some extent) in several of the masks used to make the ASIC. These masks can therefore be the same or substantially the same for all ASICs of this general kind, and they give the ASIC its "structure." Other masks (but only some of the total mask set) are customized to give the structured ASIC particular functionality that is equivalent to the functionality of a related, programmed FPGA. For example, these customized masks may configure an HLE or a small group or cluster of HLEs (a complex HLE or "CHLE") to perform functions equivalent to those performed by an ALE in the related programmed FPGA. Similarly, the customized masks may configure a CHLE to perform functions equivalent to a register in the related programmed FPGA. The customized masks may also provide interconnections between HLEs, CHLEs, and/or other circuit blocks on the ASIC. These interconnections will typically include interconnections equivalent to those provided by the programmable interconnection resources of the related programmed FPGA.

Using a structured ASIC of this kind and in this way has a number of advantages. For example, only some of the ASIC masks need to be customized. This tends to reduce ASIC cost and to speed up the ASIC design/production cycle. It also reduces the risk of a design flaw in the ASIC, and it facilitates producing an ASIC that is a close operational equivalent to the related programmed FPGA (e.g., pin-for-pin identity, timing identity or near identity, etc.). Another advantage of this approach is that it tends to allow the ASIC to include less circuitry (including less circuitry for normal operations) than the related FPGA. This is so because only as many ASIC HLEs as necessary are devoted to performing the functions of each FPGA ALE, and in almost all FPGAs many ALEs are less than fully utilized.

Efficient and reliable conversion from FPGA designs to structured ASIC designs (and vice versa) can be beneficial in a variety of contexts. For example, after an FPGA implementation of a design has been in use for awhile, it may be desired to migrate that design to a functionally equivalent ASIC in order to lower unit cost. As another example, it may be desired to use an FPGA to prototype a design that is really intended for ASIC implementation. Again, the FPGA and ASIC must be functionally equivalent for such prototyping to be meaningful.

SUMMARY OF THE INVENTION

The present invention facilitates the provision of FPGA and ASIC implementations of a user's circuit design that are functionally equivalent to one another. The user's logic design is synthesized for implementation in an FPGA, regardless of whether the immediately desired end result is a programmed FPGA or a functionally equivalent structured ASIC. In a flow leading to a programmed FPGA, the synthesis for FPGA implementation is subjected to a place and route operation that is adapted to place the synthesis on an FPGA. The output of this place and route operation can be used to produce data for programming the FPGA so that it will perform the user's logic. In an alternative flow leading to a structured ASIC, the synthesis for FPGA implementation is converted to a modified synthesis adapted for structured ASIC implementation. The modified synthesis is subjected to a place and route operation that is adapted to place the modified synthesis on a structured ASIC. The output of this place and route operation is further processed to produce a specification for the structured ASIC that includes identifications of physical circuits that are to be used in producing the structured ASIC.

One or both of the place and route operations mentioned above may change an aspect of what is specified by the user's logic design. For example, such a change may be duplication of a register or shifting of a register from one part of the design to another part of that design. In accordance with a possible aspect of the invention, data for the user's logic design is modified with information about such a change. This design data modification is preferably made in such a way that subsequent use of the design data causes the change to be implemented as part of that subsequent use.

Another possible aspect of the invention relates to formally proving functional equivalence between FPGA and structured ASIC implementations being developed. This is done by comparing the outputs of the two place and route operations mentioned above.

Further features of the invention, its nature and various advantages will be more apparent from the accompanying drawings and the following detailed description.

DETAILED DESCRIPTION

Figure 2:
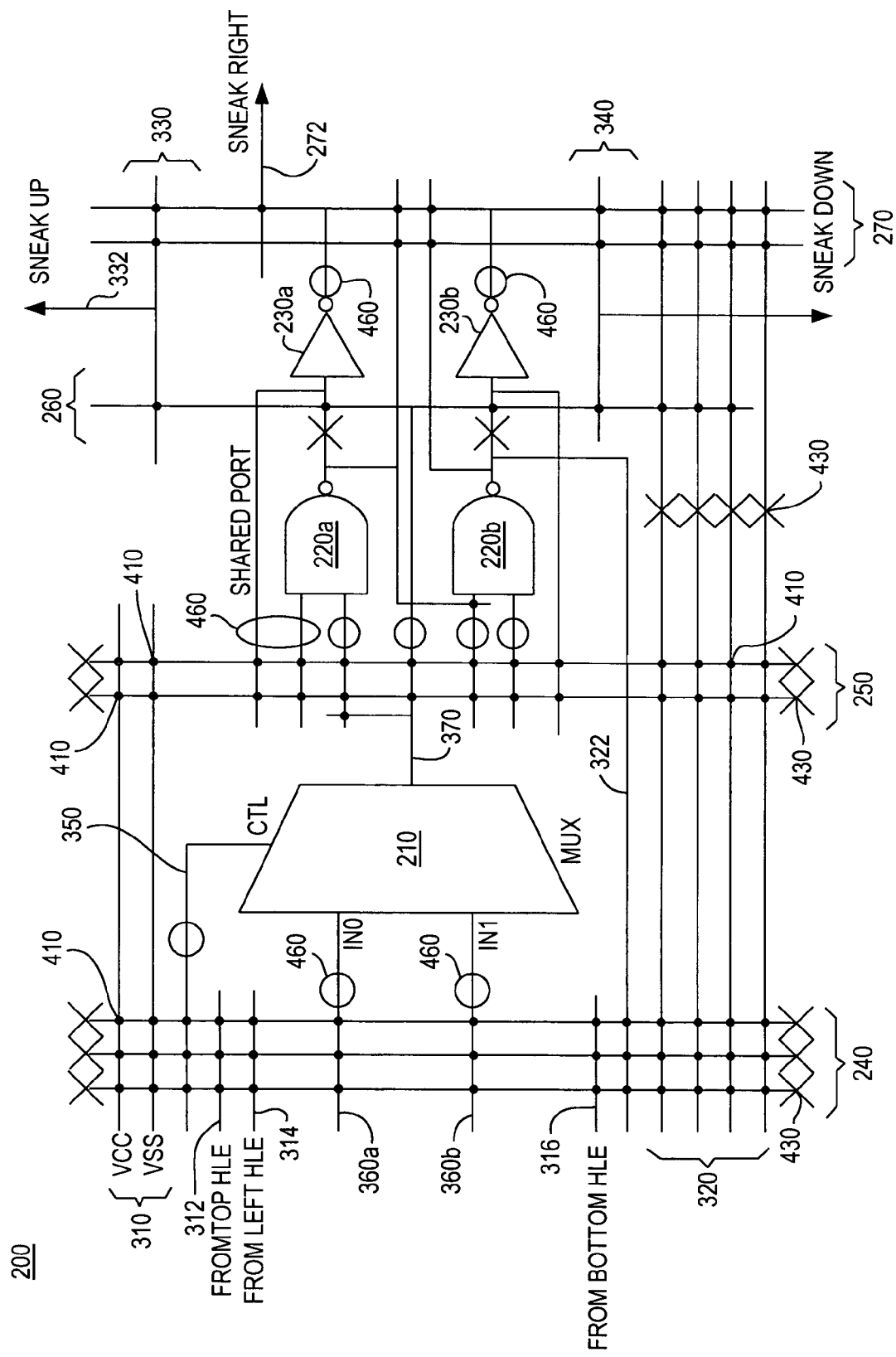
FIG. 2 is a simplified schematic block diagram of an illustrative basic unit of structured ASIC circuitry that is useful in explaining certain aspects of the invention.
Figure 3:
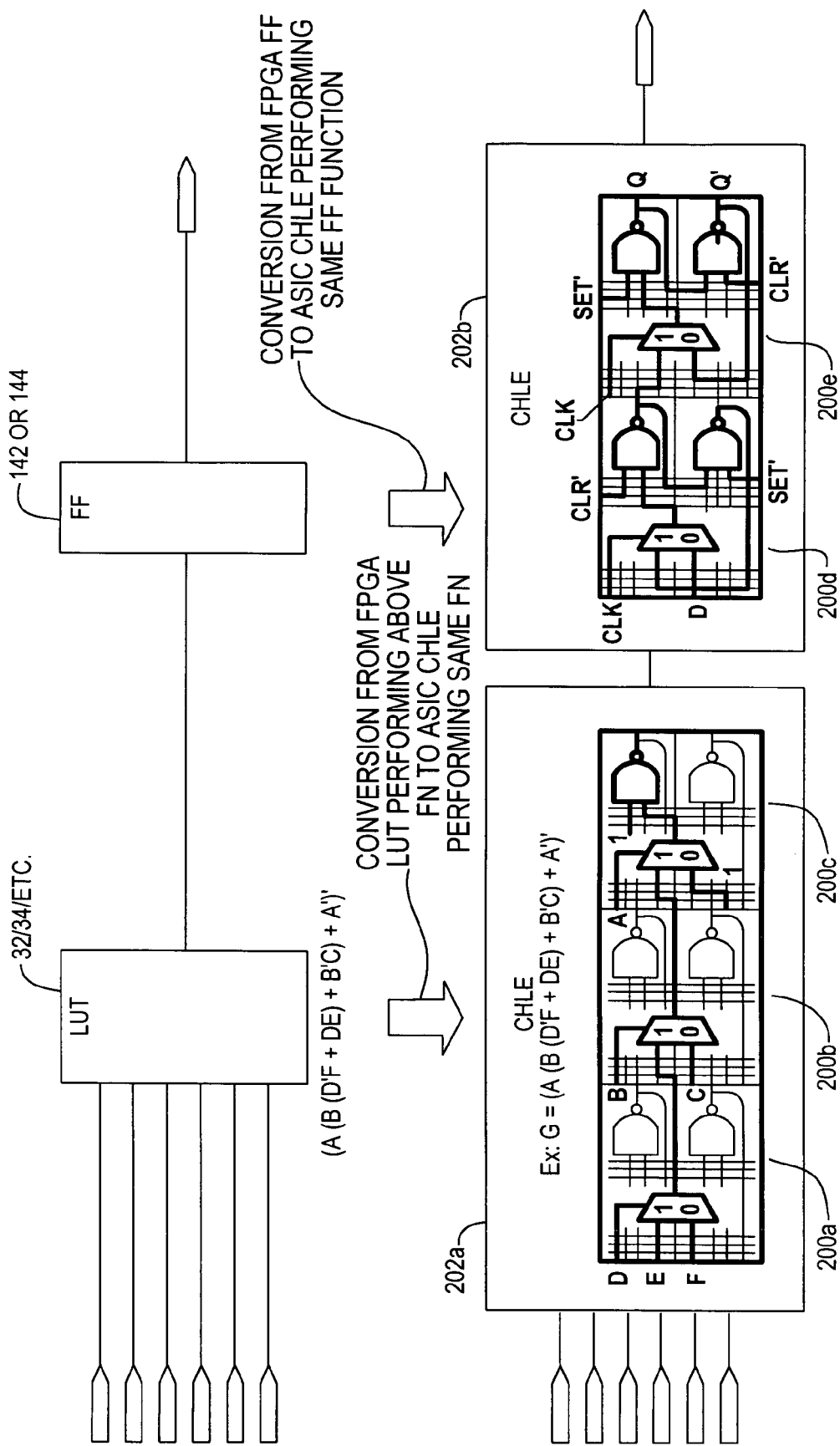
FIG. 3 is a simplified schematic block diagram showing equivalent implementations of certain illustrative circuit functions in FPGA and structured ASIC circuitry.

This specification illustrates the invention in the context of migrating logic designs from a particular type of FPGA to a particular type of structured ASIC (or vice versa). These types of FPGAs and structured ASICs are explained in more detail in such references as Chua et al. U.S. patent application Ser. No. 10/884,460, filed Jul. 2, 2004, and Schleicher et al. U.S. patent application Ser. No. 11/050,607, filed Feb. 3, 2005, which are hereby incorporated by reference herein in their entireties. To facilitate understanding of the present invention without the need for reference to any other document, however, the next several paragraphs and related FIGS. 1-3 are reproduced (with only minor modifications) from the above-mentioned Schleicher et al. reference.

Figure 1:
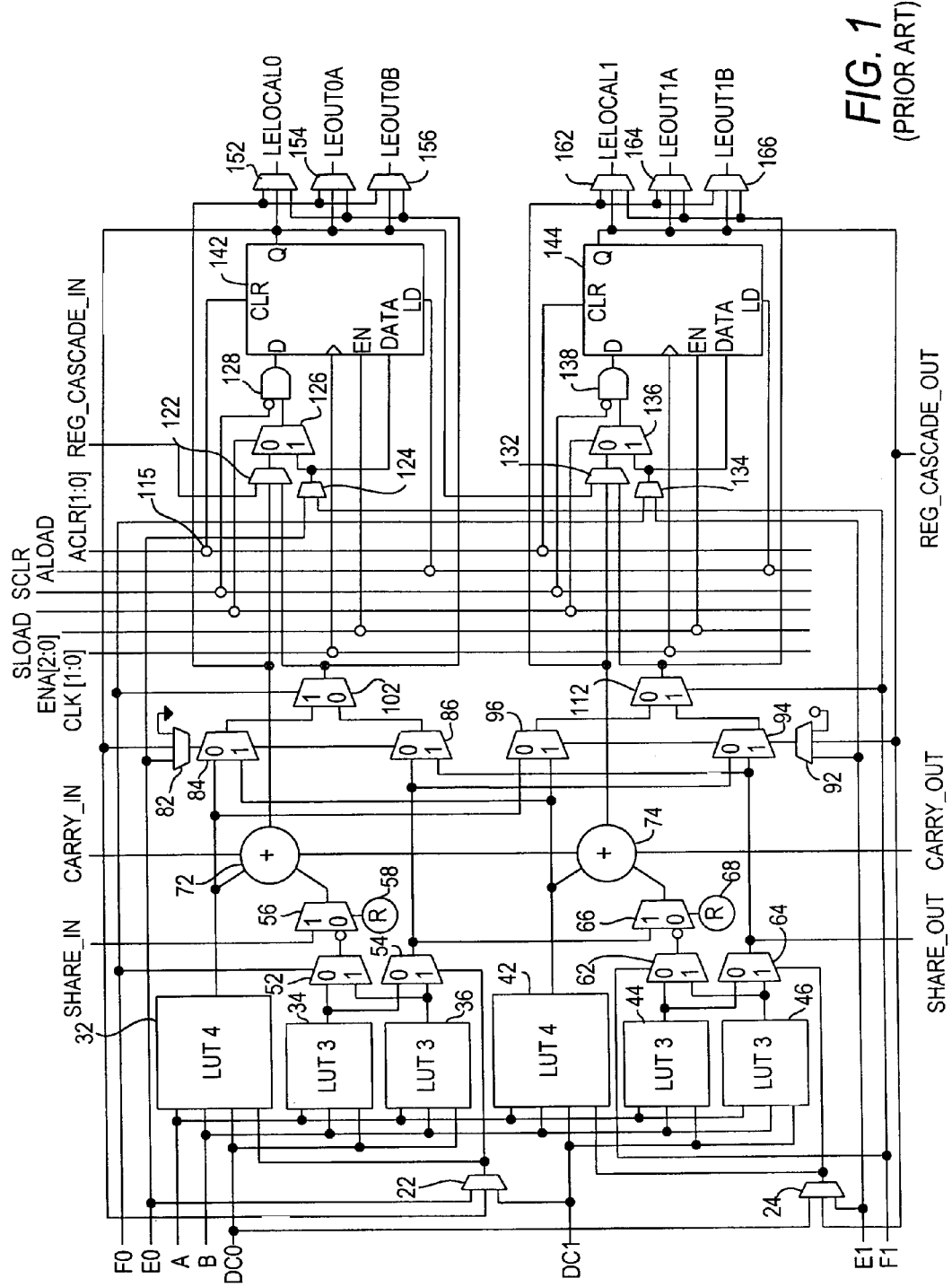
FIG. 1 is a simplified schematic block diagram of an illustrative basic unit of FPGA circuitry that is known to those skilled in the art.

An illustrative example of a basic logic circuit building block or unit 10 for inclusion in an FPGA is shown in FIG. 1. This FPGA building block circuitry (also sometimes referred to as an adaptive logic element ("ALE") or an adaptive logic module ("ALM")) is known to those skilled in the art and can therefore be described in a somewhat abbreviated way herein. ALE 10 includes multiplexers 22, 24, 52, 54, 56, 62, 64, 66, 82, 84, 86, 92, 94, 96, 102, 112, 122, 124, 126, 132, 134, 136, 152, 154, 156, 162, 164, and 166. Most of these multiplexers are programmably controlled by programmable random access memory ("RAM") bits that are generally not shown in the drawings (although RAM bits 58 and 68 in FIG. 1 are illustrative). Some of these multiplexers are more dynamically controlled by signals that can change during normal operation of the device. Multiplexer 112 is an example of this latter type of multiplexer. It is controlled by input F1 to ALE 10.

ALE 10 also includes look-up tables ("LUTs") 32, 34, 36, 42, 44, and 46. LUTs 32 and 42 are four-input look-up tables. The other LUTs are three-input look-up tables. Each of these LUTs is programmable to provide an output signal that is any logical combination of the input signals to that LUT.

Other components of ALE 10 are full adders 72 and 74, AND gates 128 and 138, and flip-flops 142 and 144. The conductor interconnections shown by open circles (e.g., connection 115) are programmable interconnections, which means that the interconnection may or may not be made, as desired by the user.

The LUT resources of ALE 10 are sufficient to enable the ALE to form any logical combination of up to six inputs to the ALE. Alternatively, if two somewhat smaller functions have some inputs in common, then the LUT resources of ALE 10 may be sufficient to perform two such functions. For example, it may be possible for an ALE 10 to form two five-input combinations, two four-input combinations, etc.

Full adders 72 and 74 enhance the arithmetic capabilities of ALE 10. For example, these components give ALE 10 the ability to perform two adjacent places of the binary addition of two numbers, including the handling of carry in and carry out signals.

Registers 142 and 144 (and associated circuitry) allow signals in ALE 10 to be either registered (by a register) or unregistered (bypassing a register). An ALE 10 register does not have to be used to register a signal originating in the ALE. A register can instead be used (in so-called lonely register mode) to register an input signal to the ALE. Other circuitry of the ALE can be used for other purposes while one or both of registers 142 and 144 are used in lonely register mode. Registers 142 and 144 are also capable of operating in different asynchronous or synchronous modes. "D" is the normal data input to each register; "DATA" is the asynchronous load data.

FIG. 2 shows an example of a basic logic circuit building block or unit 200 for inclusion in a structured ASIC. FIG. 2 herein is the same as FIG. 3 in the above-mentioned Chua et al. reference. Accordingly, the description of FIG. 2 can be somewhat abbreviated herein. Building block 200 may also be referred to as a hybrid logic element or HLE.

HLE 200 includes two-input multiplexer 210, NAND gates 220a and 220b, and inverters 230a and 230b. HLE 200 also includes some interconnection resources, some of which are mask programmable. For example, Xs identify locations at which conductor segments can be connected to one another or not, as desired, by appropriately customizing a mask (or masks) used to make the ASIC. Similarly, Os identify locations at which connections can be made, if desired, to one or more circuit layers (not shown) in which relatively long-distance interconnection conductors can be provided. Again, these connections and inter-connections are made by appropriately customizing one or more of the masks used to make the ASIC. The solid dots at conductor intersections in FIG. 2 are also connections that can be made or not made, as desired, between the intersecting conductors. Once again, these connections are made, if desired, by appropriately customizing one or more of the masks used to make the ASIC.

It will be apparent that the logic capabilities of HLE 200 are much less than the logic capabilities of ALE 10 (FIG. 1). However, a relatively small number of adjacent or nearby HLEs can generally be put together to perform any function(s) that an ALE is performing in a user's logic design that has been implemented in an FPGA. FIG. 3, for example, shows the equivalence between three HLEs 200a, b, and c and the LUT circuitry 32/34/ETC. of an ALE 10 performing a particular six-input logical combination. FIG. 3 also shows the equivalence between two more HLEs 200d and e and flip-flop circuitry 142 or 144 of an ALE 10 (which can be the same ALE as is performing the six-input logical combination shown in FIG. 3). It should be understood that HLEs 200a-e are shown greatly simplified in FIG. 3. For the most part only the HLE circuit elements and connections that are actually in use are shown in FIG. 3. All the other HLE circuitry that is shown in FIG. 2 is actually present in each HLE 200a-e, but some of this detail is omitted from the FIG. 3 depiction (or shown using lighter lines) to simplify FIG. 3. Multiple HLEs 200 that are used together (e.g., to perform combinational logic equivalent to what can be performed in LUT circuitry of an ALE, or to perform a register function equivalent to what can be performed in flip-flop circuitry of an ALE) may be referred to as a cluster of HLEs, a complex HLE, or a CHLE. FIG. 3 therefore shows two CHLEs 202a and 202b.

Figure 4:
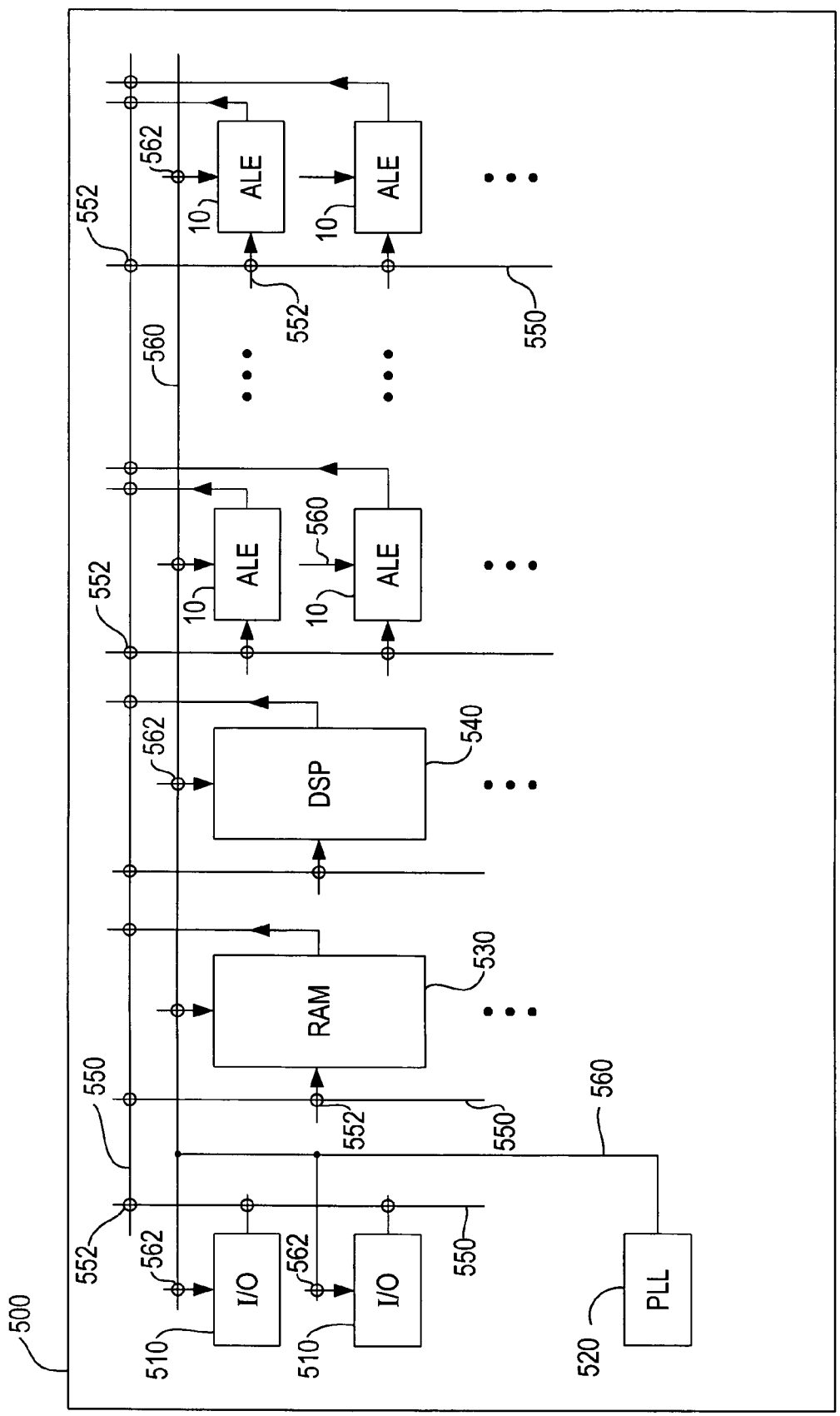
FIG. 4 is a simplified schematic block diagram of a representative portion of illustrative, known FPGA circuitry that is useful in explaining certain aspects of the invention.

FIG. 4 shows an illustrative FPGA 500 that includes an array of ALEs 10. FPGA 500 also includes various kinds of "hard blocks" such as input/output ("I/O") blocks 510, phase locked loop ("PLL") blocks 520, random access memory ("PAM") blocks 530, and digital signal processing ("DSP") blocks 540. These hard blocks are at least partly hard-wired to perform a particular function or a function programmably selected from a particular class of functions. FPGA 500 still further includes interconnection resources 550/552 that are programmable to at least some extent to interconnect the functional blocks 10, 510, 530, 540, etc. in various ways. In particular, reference number 550 is used for interconnection conductors of these resources, and reference number 552 is used for programmable interconnections between conductors 550. Clock signals (e.g., from PLLs 520) may be distributed to other functional blocks by clock distribution resources 560/562, which may again be programmable to some degree. Reference number 560 is used for conductors in these resources, and reference number 562 is used for programmable interconnections between conductors 560.

It will be understood that FIG. 4 is only generally illustrative of what may be included in FPGA 500. For example, other kinds of elements may be included in addition to what is shown in FIG. 4, or some of the elements shown in FIG. 4 may be omitted. The number and arrangement of various kinds of elements may be different from what is shown in FIG. 4. FPGA 500 is, of course, field-programmable. It is therefore capable of implementing any of an enormous number of different circuit functions that a user may desire. For convenience such various circuit functions are sometimes referred to herein as user logic designs.

Figure 5:
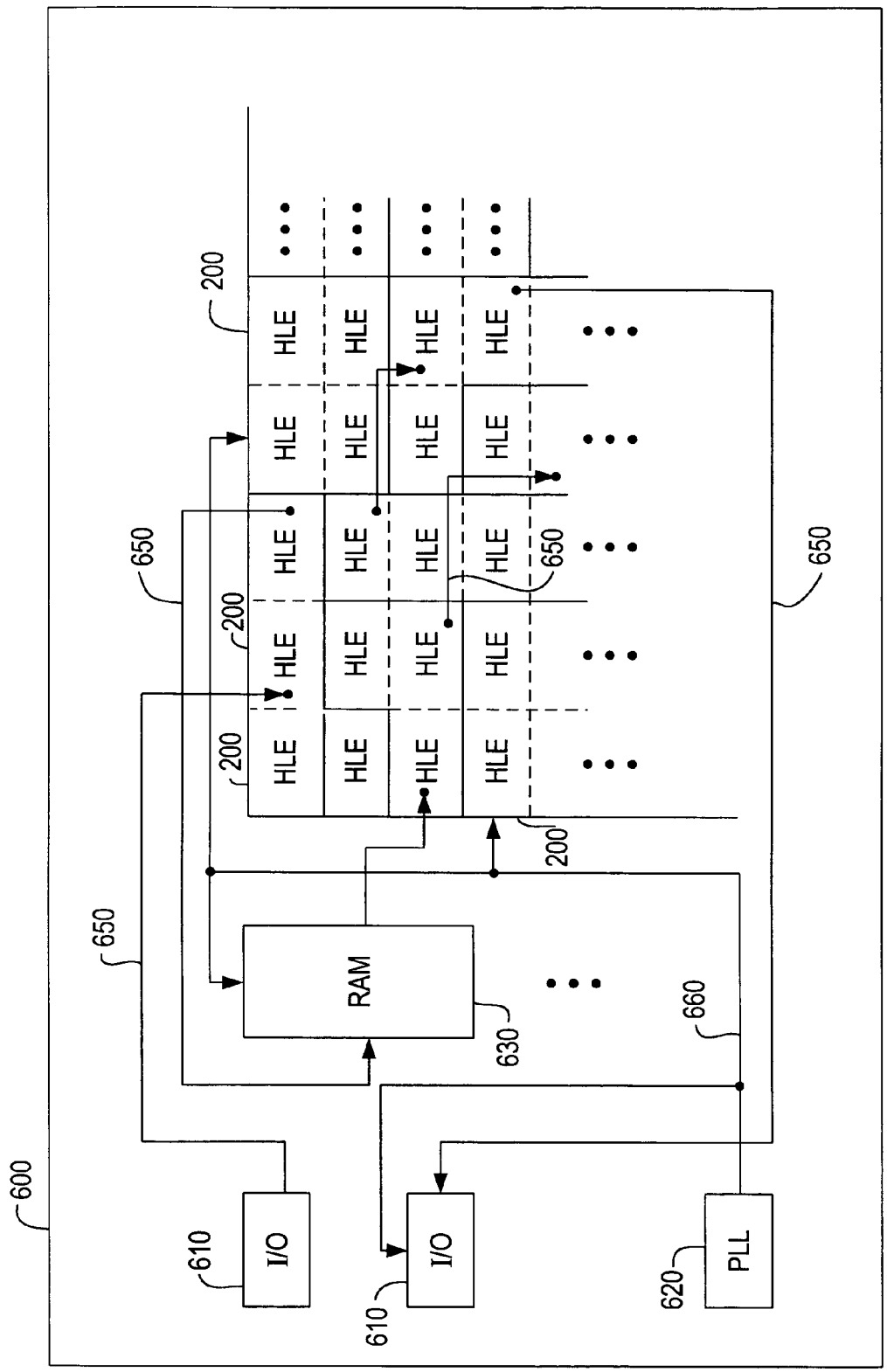
FIG. 5 is a simplified schematic block diagram of a representative portion of illustrative structured ASIC circuitry that is useful in explaining certain aspects of the invention.

FIG. 5 shows a structured ASIC 600 that can be manufactured to perform any of the user logic designs that FPGA 500 can be programmed to perform. Moreover, in accordance with this invention, structured ASIC 600 can be manufactured to perform a user's logic design equivalently to an FPGA 500 programmed to perform that logic design. In general, what is meant by such equivalence is that an FPGA 500 that is programmed to perform a user's logic design and a structured ASIC 600 that has been manufactured to perform that design can be substituted for one another (e.g., in a larger circuit that makes use of the 500/600 circuitry). Although there may be some deviations from this in some embodiments, such equivalence generally means that the pin-outs for both devices 500 and 600 are the same (or at least substantially the same), the timing of both devices is the same (or at least substantially the same), and the functions performed by both devices are the same (or at least substantially the same). However, device 600 can be physically smaller and cheaper (especially in large quantities) than FPGA 500. This is so because ASIC 600 does not need the "overhead" circuitry that is used to make FPGA 500 field programmable. It is also so because many ALEs 10 in most user logic designs are less than fully utilized, while in ASIC 600 only as many HLEs 200 are substituted for an ALE 10 as are necessary to perform the functions of that ALE. Accordingly, ASIC 600 can generally be provided with fewer HLEs 200 than would be needed to duplicate the maximum capabilities of all ALEs 10 in an otherwise equivalent FPGA 500.

ASIC 600 is referred to as a structured ASIC because it always has at least the rudiments of certain components. These component rudiments are embodied in several of the masks that are used to make all versions of ASIC 600. For example, these may be rudiments of the array of HLEs 200, I/O blocks 610, PLL blocks 620, RAM blocks 630, and the like. The number and arrangement of the blocks (especially the equivalents of certain FPGA hard blocks) may be the same as or similar to the corresponding components of FPGA 500. In addition to the above-mentioned masks that give ASIC 600 its "structure," further masks used to make ASIC 600 are at least partly customized to implement a particular user's logic design in ASIC 600. For example, these customized masks may (1) make or complete connections within HLE5; (2) make or complete connections between HLEs in a CHLE; (3) make or complete connections 650 between CHLEs, between CHLEs and other components 610/630, etc., and/or between such other components; and (4) make or complete connections 660 for distributing clock signals on the device (e.g., from PLL blocks 620). These customized masks may also make selections as to how various components will operate (e.g., the type of RAM that a RAM block 630 will be, such as single-port RAM, dual-port RAM, etc.), the type of port an I/O block 610 will be (e.g., input, output, etc.), how a PLL block 620 will operate (e.g., with how much delay of an applied clock signal), etc.

Turning now to more specifics of the present invention, important aspects include (1) parallel FPGA and structured ASIC development, (2) design constraints to force functional equivalence, (3) formal techniques to prove FPGA and structured ASIC functional equivalence, and (4) direct generation of all back-end structured ASIC handoff information (i.e., information that can control the development of the data that specifies how the structured ASIC will be customized to implement a user's logic design). These four aspects are considered in subsequent sections of this specification.

1. Parallel FPGA and Structured ASIC Development

As has been said, an important goal of this design methodology is to be able to generate both an FPGA and a structured ASIC design from a single design source such that the FPGA and structured ASIC are functionally equivalent.

Existing methodologies support either migrating a completed FPGA design to a structured ASIC ("FPGA conversion"), or re-synthesizing a structured ASIC design to target an FPGA ("ASIC prototyping"). These techniques fail to fully enable the cost and performance benefits of the structured ASIC architecture, while at the same time not providing a strong verification link between the FPGA used for in-system verification and the final structured ASIC used in production.

Figure 6:
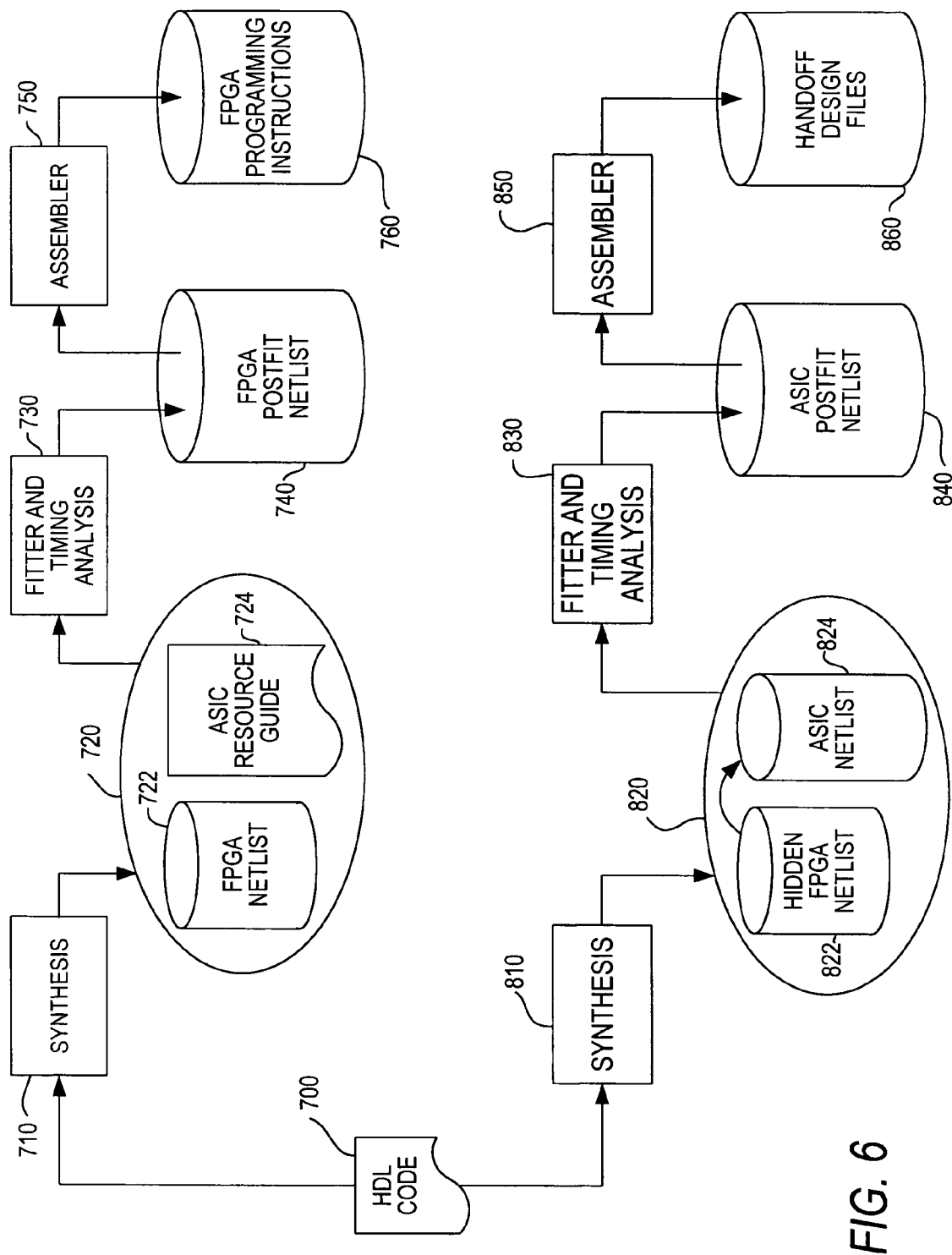
FIG. 6 is a simplified block diagram or flow chart showing illustrative circuit design flows in accordance with the invention.

The present methodology is based on developing a complete HDL-to-handoff-files compilation flow for the structured ASIC that mirrors the traditional FPGA flow. FIG. 6 illustrates this concept. From a single design source (e.g., HDL code 700) a user can choose to target either an FPGA by employing the upper flow path that leads to production of FPGA programming instructions 760, or a structured ASIC by employing the lower flow path that leads to production of handoff design files 860 (which can be used to directly or substantially directly control production of at least part of the data needed to design the masks needed to fabricate an appropriately customized structured ASIC). For either choice, the flow steps are similar.

As an example, consider first the upper flow in FIG. 6. In some respects this discussion will be initially at a relatively high level, with further details being supplied later in this specification. In step 710 the HDL code 700 of the user's logic design is synthesized into an FPGA netlist 722. As a possible option, FPGA netlist 722 may be examined by ASIC resource guide software 724 to identify one or more available structured ASIC products that include the capabilities that would be needed to produce a structured ASIC equivalent of an FPGA implementing the FPGA netlist. As just one example of this, if there are two available structured ASIC products that include two and four PLL blocks 620, respectively, and if FPGA netlist 722 indicates a need for only two PLL blocks, then ASIC resources guide 724 might show that the first of the two ASIC products can be used to implement FPGA netlist 722 (assuming that the FPGA netlist does not exceed the capabilities of that first structured ASIC product in any other respect). Again, however, providing this feature 724 is entirely optional and can be omitted if desired.

From flow element 720 (including flow sub-element 722 and (optionally) flow sub-element 724) the upper flow in FIG. 6 proceeds to flow element 730, in which netlist 722 is placed and routed on or with respect to a particular FPGA device or device family. (Step 730 may also be referred to as a fitter and timing analysis step.) Thus step 730 honors the physical restrictions of a particular FPGA device or device family. This results in FPGA post-fit netlist 740. This post-fit netlist is still what may be termed a logical view of the user's logic design.

The next step is to pass FPGA post-fit netlist 740 through assembler 750. This converts the logical view of the user's logic design into a physical representation of that design, i.e., a programming bit-stream 760 for the FPGA. The data from step 760 can be used to actually program an FPGA so that it will implement the user's logic design.

Turning now to the lower flow path shown in FIG. 6, synthesis step 810 is similar (preferably identical or at least substantially identical) to above-described synthesis step 710. Accordingly, step 810 produces (from the HDL specification 700 of the user's logic design) an FPGA netlist 822 that is similar (preferably identical or at least substantially identical) to above-described FPGA netlist 722. However, FPGA netlist is referred to as "hidden" because it is not actually used to produce an FPGA implementation of the user's logic design. Instead, within flow step 820, hidden FPGA netlist 822 is converted to a structured ASIC netlist 824. As will be described in more detail below, this conversion is done in such a way that functional equivalence between an FPGA implementing netlist 822 and an ASIC implementing netlist 824 is ensured.

The structured ASIC netlist 824 from netlist conversion step 820 is passed through fitter and timing analysis step 830 to produce ASIC post-fit netlist 840. This places and routes structured ASIC netlist 824 on or with respect to a particular structured ASIC device or device family, honoring the physical restrictions of that device or device family. Thus, whereas step 730 is FPGA-specific (or at least primarily so), step 830 is ASIC-specific (or at least primarily so). Again, ASIC post-fit netlist is still what may be termed a logical view of the user's logic design.

The next step in the lower flow shown in FIG. 6 is to pass ASIC post-fit netlist 840 through assembler 850 to produce structured ASIC handoff design files 860. For example, design files 860 may be a structured verilog netlist that can be further processed to produce the data needed to actually customize the structured ASIC so that it will implement the user's logic design.

Note that the upper and lower flows in FIG. 6 can be performed either at the same time or at different times. If only an FPGA implementation of the user's logic design is needed initially, only the upper flow needs to be performed initially. If a functionally equivalent structured ASIC implementation of the user's logic design is needed later, the lower flow can be performed later. As another example, if only a structured ASIC implementation of the user's logic design is needed initially, only the lower flow needs to be performed initially. But it will be apparent from what has been said that this lower flow ensures that a functionally equivalent FPGA implementation of the user's logic design can be produced later by later performing the upper flow.

Another point that should be noted from FIG. 6 and what has been said above is the following: Because the FPGA and structured ASIC compiler flows are set up to directly support the respective underlying device architectures, the fundamental benefits of the two different architectures are not lost. In other words, the goal of being able to produce functionally equivalent FPGA and structured ASIC implementations of a user's logic design does not result in inefficient or uneconomical use of either type of architecture in producing those implementations.

To ensure that the flows shown in FIG. 6 produce functionally equivalent FPGA and structured ASIC implementations of user logic designs, the FPGAs and structured ASICs for which the FIG. 6 flows are employed are designed such that the process technology and the functionality of the hard blocks are the same. (As a reminder, examples of hard blocks in FIG. 4 are 510, 520, 530, and 540. Examples of hard blocks in FIG. 5 are 610, 620, and 630.) In addition, the representation chosen for the device architectures must be at the same abstraction. In the illustrative embodiment shown in FIG. 1 the FPGA abstraction model has been chosen for both the FPGA and structured ASIC compiler flows. Each type of functional object in the FPGA is represented as an atom type. Typical atoms include I/O, RAM, DSP, PLL, registers, and logic. The structured ASIC has the identical set of atoms, but with the attributes appropriate for the structured ASIC. For example, the combinatorial logic atom for an FPGA may represent any six-input function in the illustrative embodiment generally assumed herein, in which the FPGA architecture supports a full six-input look-up table ("LUT"). The combinatorial logic atom in a corresponding structured ASIC may only support the six-input functions that are included in a structured ASIC synthesis cell library.

In addition to choosing a common logical representation for the FPGA and the structured ASIC, the invention uses a single synthesis technique 710/810 to generate both the FPGA netlist 722 and the structured ASIC netlist 824 without resorting to re-synthesis of the user's HDL code 700. In this single synthesis technique, identical synthesis steps are performed for both the FPGA and the structured ASIC designs until the final device-specific technology mapping 720 or 820. This final step is then done by technology mapping to the FPGA, and then (if in the lower flow path in FIG. 6) performing a cell by cell translation to the structured ASIC synthesis cell library. This translation is represented by the arrow from flow element 822 to flow element 824 within flow element 820 in FIG. 6. If the synthesis is targeting the FPGA (upper flow path in FIG. 6), it stops with the result 722 of the FPGA technology mapping. If the synthesis is targeting the structured ASIC (lower flow path in FIG. 6), it continues through the translation to the structured cell library. The end results are an FPGA netlist 722 and/or a structured ASIC netlist 824 with a well-defined common structure and complete functional equivalence.

2. Design Constraints to Force Functional Equivalence

The logical FPGA-style abstraction enables the computer-aided design tool flow to perform various relatively uncomplicated physical synthesis-style transformations during place and route operations 730/830. For example, these transformations may include register duplication and/or register packing into I/O, RAM, or DSP blocks. An illustration of register duplication would be a case in which a register in core logic feeds two output pins of the device. It is better (e.g., from the standpoint of timing) to have the core logic source feed two separate registers, one in each of the two I/O blocks. The place and route step 730/830 can make this netlist modification to facilitate device-performance improvement. An illustration of register packing is shifting registers from core logic into I/O, RAM, and/or DSP blocks, again to improve device timing and component utilization. Again, place and route step 730/830 can make such netlist modifications.

By their nature, netlist modifications of the type mentioned in the preceding paragraph are device-specific optimizations because they take into account specific device floorplan and timing information. These modifications are also important to achieve the maximum performance potential in an FPGA design. In order to ensure a one-to-one functional equivalence between the FPGA and structured ASIC, it is desirable to control all of these transformations during place and route 730/830 to produce identical transformations for both the FPGA and the structured ASIC.

The present invention accomplishes the foregoing in two parts. First, every transformation that can be performed in the place and route compiler 730/830 has "assignments" added that can control precisely what transformation is done. This is similar in concept to engineering-change-order-style modifications that can be done in a traditional ASIC back-end flow. The difference is that this is done to the logic atom representation and is mirrored on both the FPGA and structured ASIC designs.

The second part of the foregoing is a method for recording these transformation assignments during a normal place and route 730/830 such that they can be either (a) back-annotated onto the original FPGA or structured ASIC design to cause reproduction of the result, or (b) migrated to the companion structured ASIC design for an FPGA (or FPGA design for a structured ASIC) to produce the functionally equivalent structured ASIC result compared to the original FPGA.

Figure 7A:
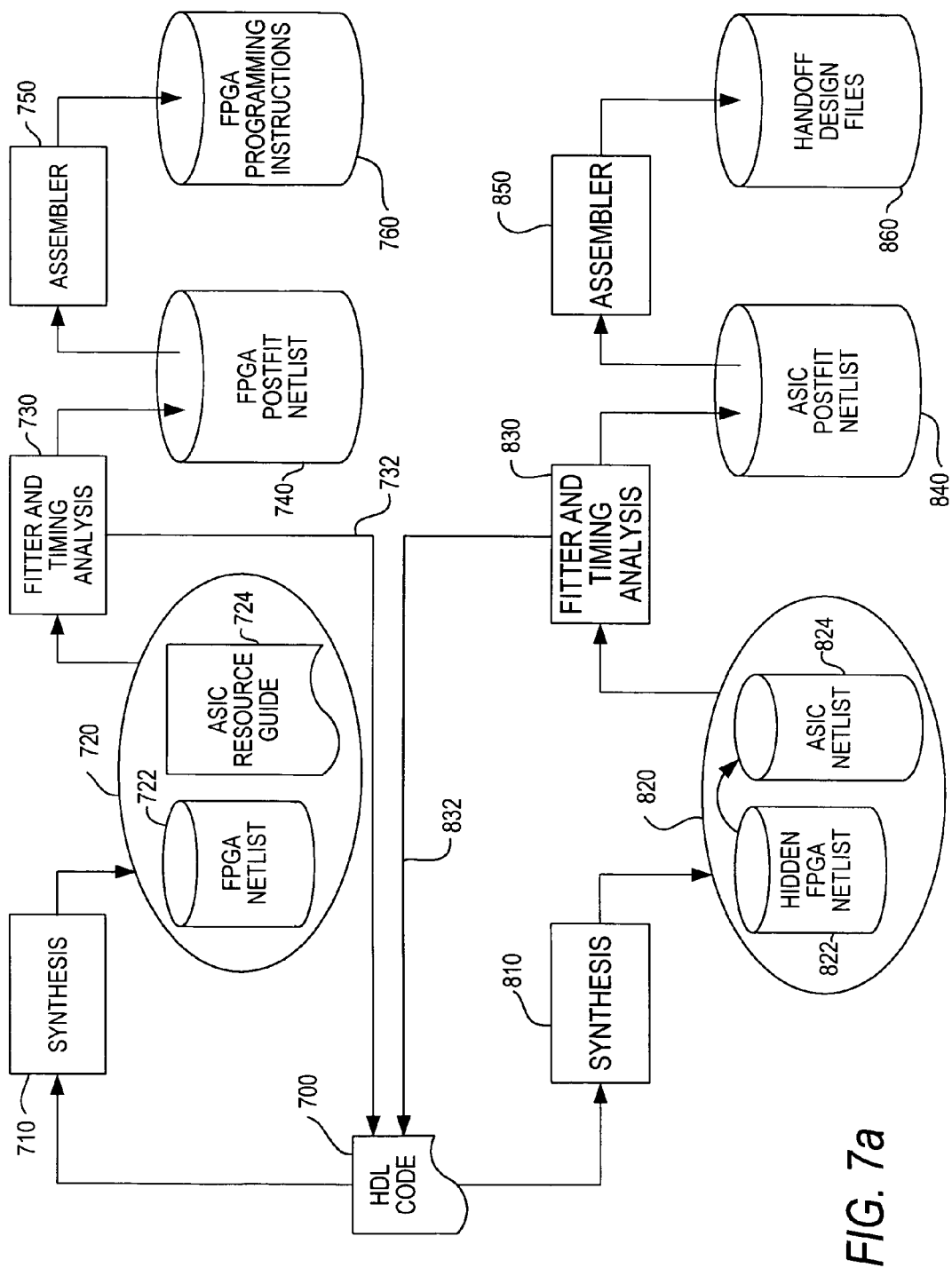
FIG. 7a is similar to FIG. 6 with possible additional flow paths in accordance with the invention.

FIG. 7a shows an illustrative embodiment of how the foregoing may be accomplished in accordance with the invention. (FIG. 7a is identical to FIG. 6 except for the modifications that will now be discussed.) If the upper flow in FIG. 7a is being used, then any transformation made by fitter and timing analysis flow element 730 is recorded as part of the data for the original HDL code 700. This is done via flow path 732. Then, if HDL code 700 is subsequently processed in the lower flow in FIG. 7a, the same transformations can be made in the lower flow (e.g., in place and route step 830). In this way, for example, a register duplication that was found desirable (in step 730) for the FPGA implementation of a user's logic design 700 will be subsequently replicated (by step 830) in the structured ASIC implementation of that design.

As another illustration of the foregoing, a transformation found (in step 830) to be desirable for a structured ASIC implementation of a user's logic design 700 is made part of the data for design 700 via flow path 832. In this way, any subsequent performance of the upper flow in FIG. 7a will include replication of that transformation in the course of developing an FPGA implementation of logic design 700.

Figure 7B:
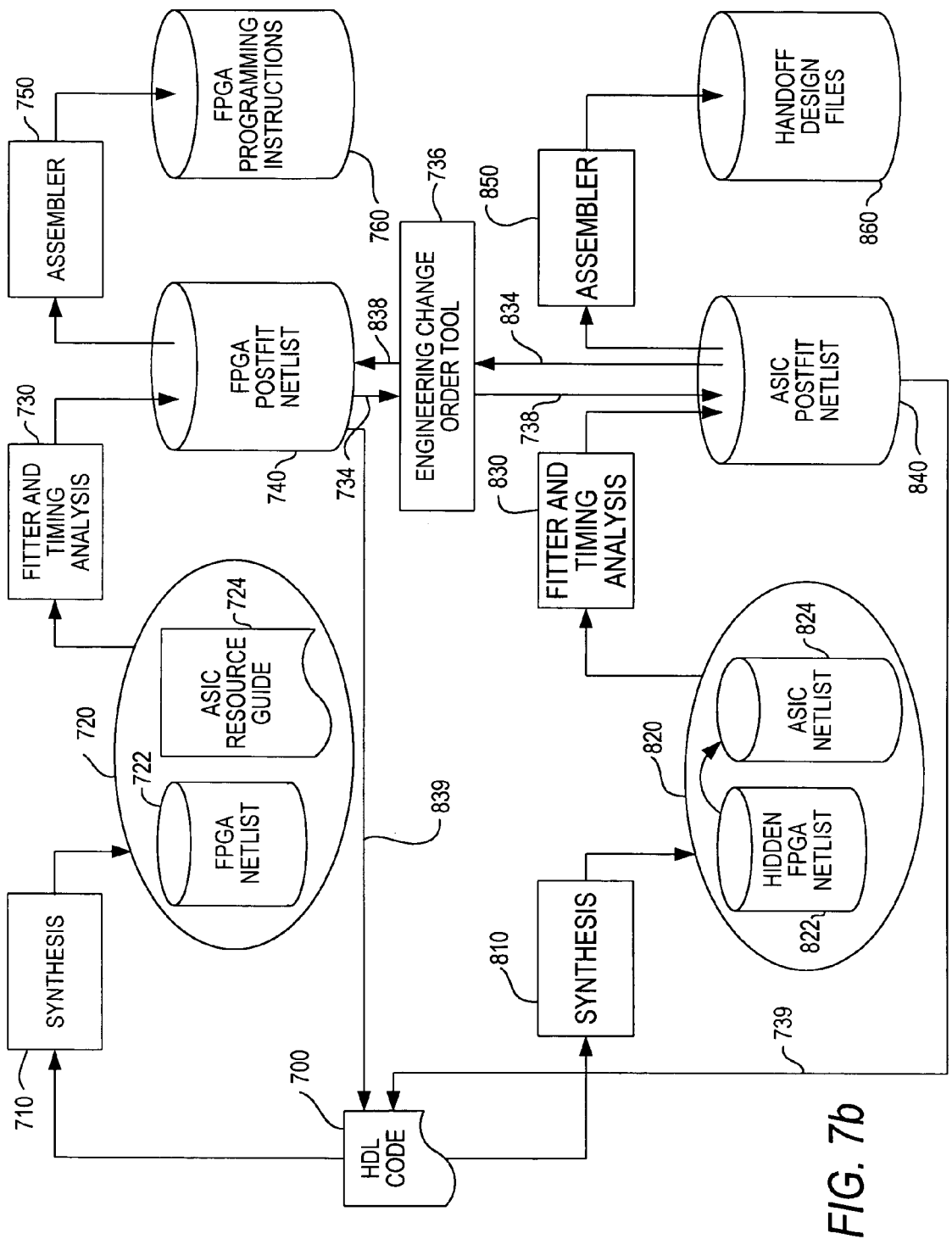
FIG. 7b is again similar to FIG. 6 with possible additional flow paths in accordance with the invention.

FIG. 7b shows some alternatives to what is shown in FIG. 7a. In FIG. 7b a transformation found (after step 730) to be desirable for an FPGA implementation of a user's logic design 700 is reported to engineering change order tool 736 via flow path 734. Then in any subsequent performance of the lower flow, that transformation becomes an engineering change order that is applied via flow path 738 to ASIC post-fit netlist 840. The ASIC post-fit netlist is modified in accordance with this engineering change order information. This modification may also become part of HDL code 700 via flow path 739.

FIG. 7b also shows that a flow of the type described in the preceding paragraph can proceed in the opposite direction. Thus a transformation found (after step 830) to be desirable for a structured ASIC implementation of a user's logic design 700 is reported to engineering change order tool 736 via flow path 834. Then in any subsequent performance of the upper flow, that transformation becomes an engineering change order that is applied via flow path 838 to FPGA post-fit netlist 740. The FPGA post-fit netlist is modified in accordance with this engineering change order information. This modification may also become part of HDL code 700 via flow path 839.

Either or both of the flow directions described in the two preceding paragraphs may be provided in various embodiments of the invention.

A related (optional) aspect of the invention is the following: By constraining designs in the above-described manner, it is possible to have compiler flows that can support different levels of functional equivalence. By changing what transformations are constrained (e.g., by allowing some types of transformations to be performed without constraint (i.e., a requirement for replication of the transformation in the other type of implementation of the user's logic design), while constraining other types of transformations (i.e., requiring replication of the transformation in the other type of implementation of the user's logic design)), some freedom between the FPGA and structured ASIC compilers can be allowed. For example, duplicating registers might be allowed without a requirement for replication in the other type of logic design implementation 5 because that is an easy transformation to verify using other formal techniques. But register packing for I/Os might always be required to be replicated in both types of logic design implementations because of the critical timing nature of the Tco delays.

3. Formal Techniques to Prove FPGA and Structured ASIC Functional Equivalence

Those skilled in the art of formal logic equivalence will appreciate that the structured synthesis methodology of this invention that is used to generate the initial FPGA and structured ASIC netlists 722 and 824, combined with the constraints added to the physical transformations during place and route 730/830, make proving the logical equivalence of the results (e.g., 740 and 840) a solvable proposition. On the other hand, it will also be apparent to those skilled in the art that this only verifies the logic portion of the netlists 740 and 840, and not the complete functionality of the netlists. The present invention expands on the traditional logic equivalence check ("LEC") verification to also prove that the non-logic portions of the netlist are equivalent. This is done in a deterministic manner that is independent of underlying design complexity.

Figure 8A:
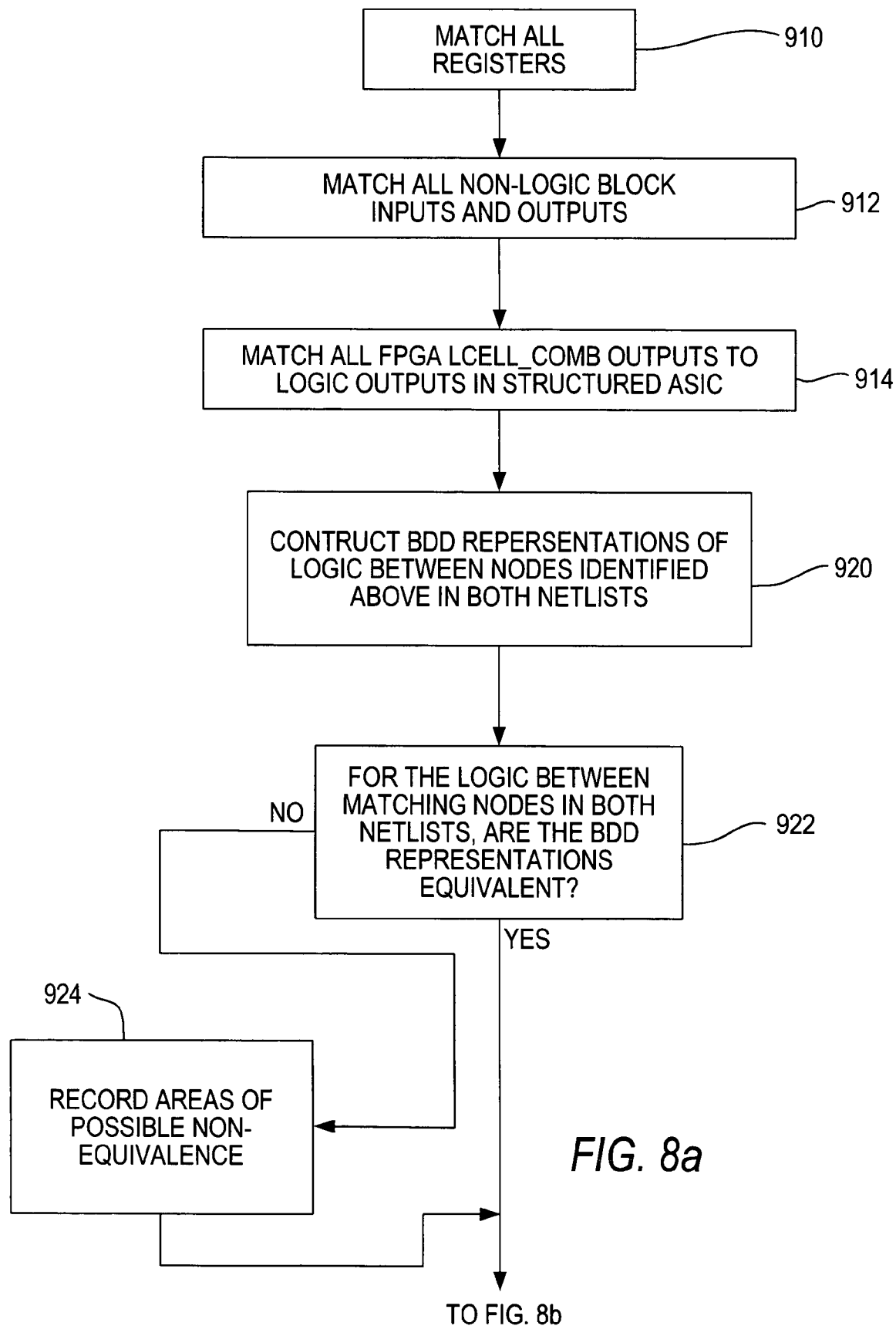
FIGS. 8a and 8b are collectively a simplified flow chart of additional steps that can be performed in flows like those in FIGS. 6, 7a, and 7b in accordance with the invention.
Figure 8B:
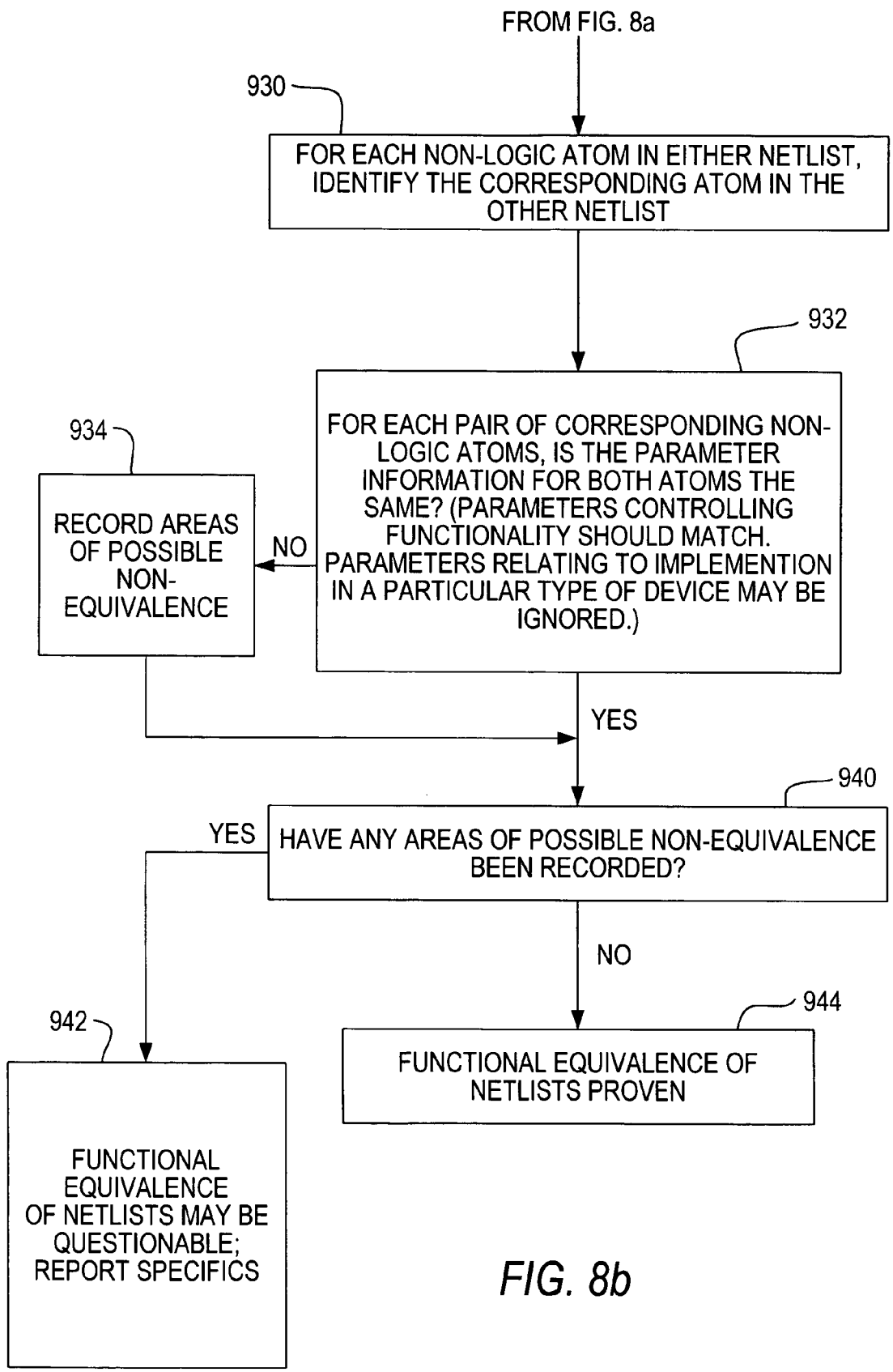

FIGS. 8a and 8b show an illustrative 30 embodiment of aspects of the invention that relate to proving functional equivalence between FPGA netlist 740 and structured ASIC netlist 840. The method illustrated by FIGS. 8a and 8b may be thought of as including two main parts: (1) the steps shown in FIG. 8a that relate to proving functional equivalence of the logic fabric of the devices, and (2) the steps shown in FIG. 8b that relate to proving functional equivalence of the remainder of the devices.

In step 910 each register in one of netlists 740/840 is matched with the corresponding register in the other netlist.

In step 912 the inputs and outputs of each non-logic block in one of netlists 740/840 are matched to the inputs and outputs of the corresponding non-logic block in the other netlist. These non-logic blocks and their inputs and outputs must match because a premise of the design methodology of this invention is that the FPGA and the structured ASIC include the same non-logic block resources available for possible use. These means, for example, that I/O blocks 510 and 610 are similar resources, that PLL blocks 520 and 620 are similar resources, that RAM block 530 and 630 are similar resources, etc. (An exception to this in the present embodiment is that FPGA DSP blocks 540 are implemented in the general-purpose logic fabric 200 of structured ASIC 600, rather than in dedicated DSP blocks in the ASIC. This is an optional deviation from the general cases described in the preceding sentences. Despite this deviation, the logical atom representation of a DSP block is still the same for both the FPGA and structured ASIC, even though the physical implementation is different.)

In step 914 all FPGA logic cell (i.e., ALE 10) combinational outputs are matched to nodes in the structured ASIC netlist. The structured synthesis employed herein (as described above) means that there is a maximum number of structured ASIC library cells needed to implement the combinational logic in a single FPGA ALE 10. Thus the combinational logic of an FPGA ALE 10 has been implemented in the structured ASIC using one HLE 200, one CHLE (of a given, relatively small, plural number of HLEs), or a given, relatively small, plural number of CHLEs. The HLE/CHLE resources used to implement one FPGA ALE 10 are not also used for any other purpose (e.g., to implement any of the functionality of any other ALE 10). All of this makes the step-914 matching a straight-forward task.

At the conclusion of step 914 a large number of matched nodes have been identified. In addition, the maximum size of the netlists between these matched nodes is bounded (e.g., by the maximum combinational logic capability of each ALE 10 and the maximum number of HLE/CHLE cells needed to implement such maximum ALE functionality). A still further consideration is the nature of the synthesis technique used to generate the FPGA and structured ASIC netlists (e.g., the use of library conversions from FPGA ALE logic to HLE/CHLE implementations of that logic, the fact that there is a one-for-one correspondence between the functionality provided by one ALE 10 and one HLE/CHLE resource cluster, etc.). All of these considerations make it possible, in accordance with the invention, to guarantee that a formal comparison can be made between the two netlists 740/840 using-formal techniques of constructing binary decision diagram ("BDD") representations of the logic between matched nodes in the two netlists and proving each such BDD pair equivalent. This is what is done in steps 920 and 922 in FIG. 8a. Any exceptions or possible exceptions to such equivalence (there should not be any) are recorded in step 924. Without the structured synthesis and constrained physical transformations as described above, it might be possible for there to be cases in which automated equivalence-proving techniques "blew up" in memory or run-time requirements.

Step 930 begins the processing of the non-logic parts of netlists 740/840. In step 930, for each non-logic atom in one of netlists 740/840, the corresponding atom in the other netlist is identified. Again, the presence of such corresponding non-logic atoms in both netlists is a requirement of the structured synthesis and the place and route physical synthesis constraints employed herein as described above.

In step 932 the parameter information of the non-logic atoms in each pair of corresponding non-logic atoms is compared. Examples of parameter information for I/O blocks 510/610 include whether the I/O block is an input or an output, whether the register in the I/O block is being used, etc. Examples of parameter information for RAM blocks 530/630 include whether the RAM block is a single port or dual port RAM, the width of the RAM, what clock is used on the input side, what clock is used on the output side, etc. As noted in step 932 the parameters that should match are those that control functionality. Parameters that relate to how the non-logic atom is physically implemented in a particular type of device (e.g., in an FPGA or a structured ASIC) can be ignored. Location information is an example of this latter type of parameter information, which can be ignored as noted in step 932. Any exceptions or possible exceptions to the expected similarity of parameters compared in step 932 are recorded in step 934 (there should not be any such exceptions).

Steps 940 to the end can be performed after the preceding steps have been performed for all parts of netlists 740/840. In step 940 the recording (in steps 924 and/or 934) of any possible areas of non-equivalence is reviewed. If step 940 has a negative result, step 944 is performed to indicate that functional equivalence of netlists 740/840 has been proven. On the other hand, if step 940 has a positive result, step 942 is performed to indicate that netlists 740/840 may not be functionally equivalent, and to report the specifics of where that possible non-equivalence has been found.

Returning to step 932, it may be that some specific information requires an "intelligent" comparison to determine whether two atoms are functionally equivalent. An example would be a PLL block 520/620 implementing a particular amount of delay of an input clock signal. The amount of delay implemented by a PLL is determined by parameter settings associated with the PLL. But because PLL circuits can be different in FPGAs and structured ASICs, the parameter setting for producing the same amount of delay for these two types of devices may be different. The comparison tool (step 932) must be able to intelligently decide that these delay chain settings are expected to be different for the same amount of delay in the two different types of devices. For example, step 932 may make use of a table showing what different delay chain settings in the two different types of devices in fact produce the same result (i.e., the same delay) and are therefore functionally equivalent even though quantitatively different.

4. Direct Generation of All Back-End Structured ASIC Handoff Information

It has now been described how the parallel FPGA and structured ASIC compiler flows use a common logical abstraction to enable the development of a functionally equivalent FPGA and structured ASIC design. Now we continue with how this view is translated into the specific physical view 860 that will be processed by the back-end flow (not shown herein), ultimately resulting in a set of files (sometimes referred to by those skilled in the art as GDSII files) for structured ASIC device tapeout.

It is a goal of this invention that the front-end flow (as shown and described herein) directly generates the complete functional netlist 860 to be driven through the back-end. This netlist includes such features as (1) buffers inserted for routing, (2) placement constraints, (3) global routing constraints, and (4) timing constraints (for example, those initially specified by the user). An example of a placement constraint is where an I/O pin must be located on the device. Thus netlist 860 directly guides the back-end to cause the back-end to reproduce the place and route results of the front-end. The only information that can be added to this netlist in the back-end is non-user information such as test circuitry and dedicated connection information from the structured ASIC base architecture. For example, circuitry for performing scan testing of I/O registers can be added in the back-end because it is not changeable by or accessible to the user. The same is true for any built-in self-test circuitry.

The reason behind this goal of directly generating the back-end netlist 860 is to be able to provide an accurate sign-off quality tool in the front-end that predicts performance and routeability. Any transformations made in the back-end that the front-end is not aware of may prevent the overall design methodology from achieving the desired accuracy. Accordingly, such back-end transformations are avoided. In addition, only a close coupling with the back-end netlist 860 will allow the original user timing constraints or the above-described ECO-type constraints to be accurately propagated to the back-end.

In order to provide the back-end a netlist 860 at this physical level, a new physical atom abstraction is introduced and implemented in assembler 850. Whereas the previously described logical atoms (e.g., in netlists 740 and 840) allow for a common representation of the logical functionality between the FPGA and the structured ASIC, the physical atoms are designed to correspond one-for-one with the cells in the back-end netlist 860. Logical atoms (e.g., in netlists 740/840) represent classes of cells. Assembler 850 makes these specific for inclusion in netlist 860 by a combination of what are called "c-numbers" and parameterizations. A c-number is a schematic identifier that is used in the back-end flow to specify a particular schematic that is to be used to implement the physical atom. For example, the c-number for an I/O block 510/610 may be different depending on (1) where the I/O block is to be located in the final, physical, structured ASIC device (e.g., on the left or on the right in the device), and (2) the functionality of the block (e.g., whether it is a general-purpose I/O ("GIO") or a memory interface I/O ("MIO")). The parameterizations referred to above may be like some of the FPGA programming instructions in flow element 760 that relate to FPGA-style hard block programming. Examples of such parameters for a RAM block 530/630 would be the width of the data input bus, the width of the data output bus, etc.

It is the job of assembler module 850 to translate the logical atoms and their post-place-and-route information (as in netlist 840) into the physical atoms ready to be processed by the back-end.

Figure 9:
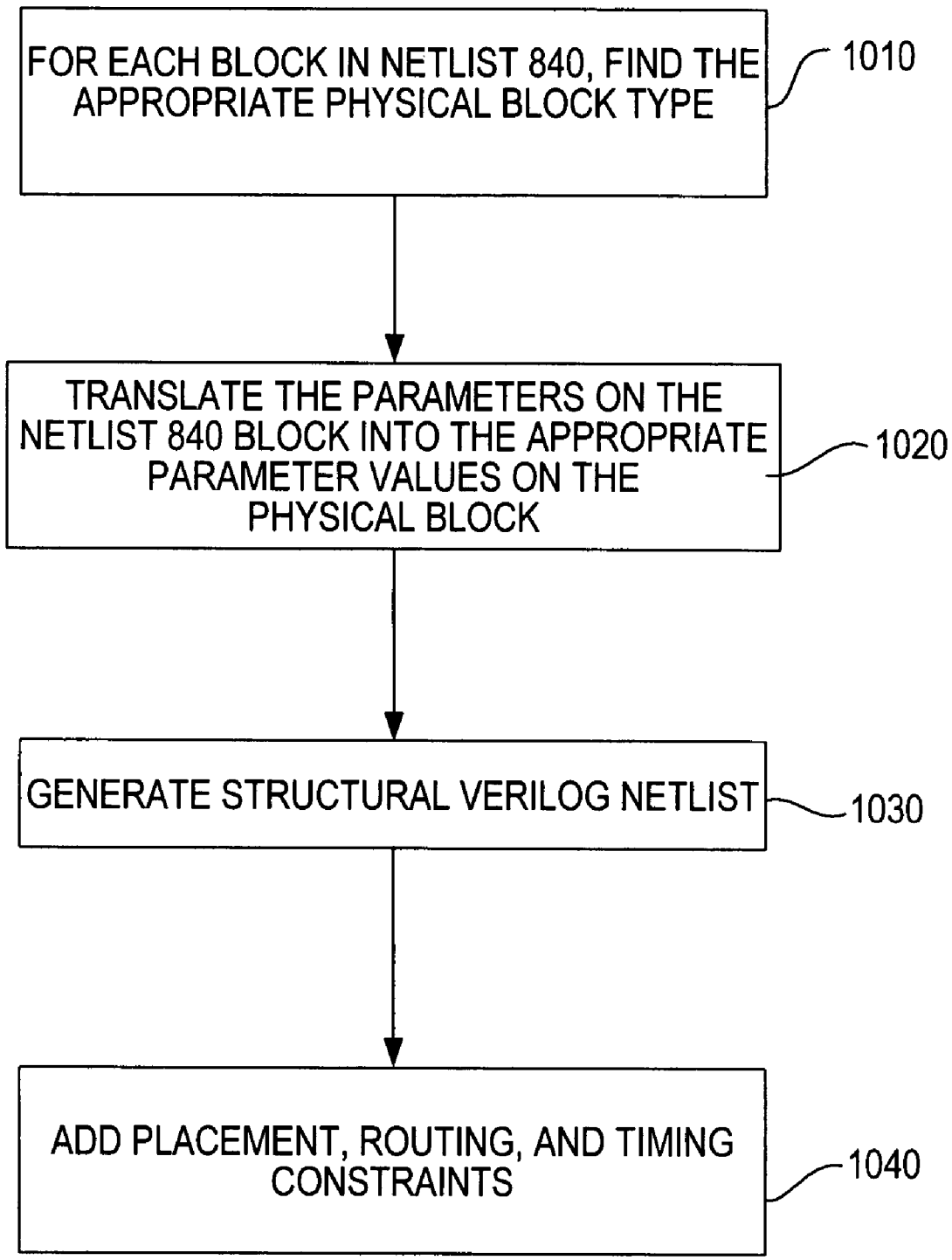
FIG. 9 is a simplified flow chart showing an illustrative embodiment of a portion of any of FIGS. 6, 7a, and 7b in more detail.
Figure 10:
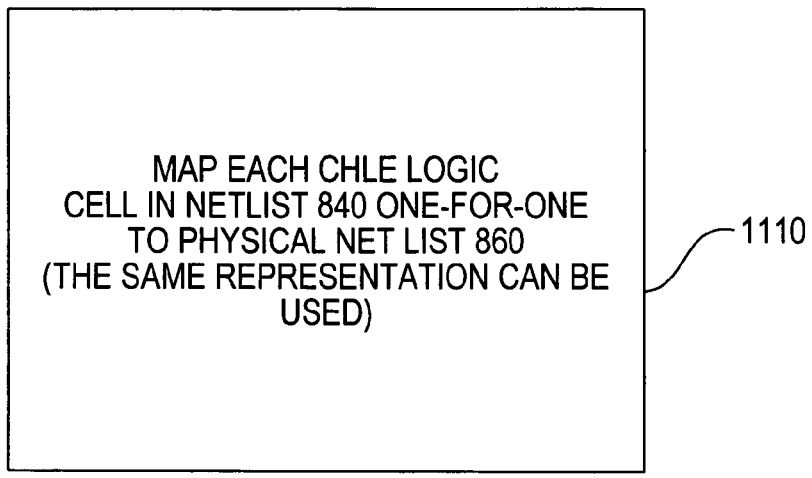
FIG. 10 is a simplified flow chart showing an illustrative embodiment of a portion of FIG. 9 for particular types of circuit blocks.
Figure 11:
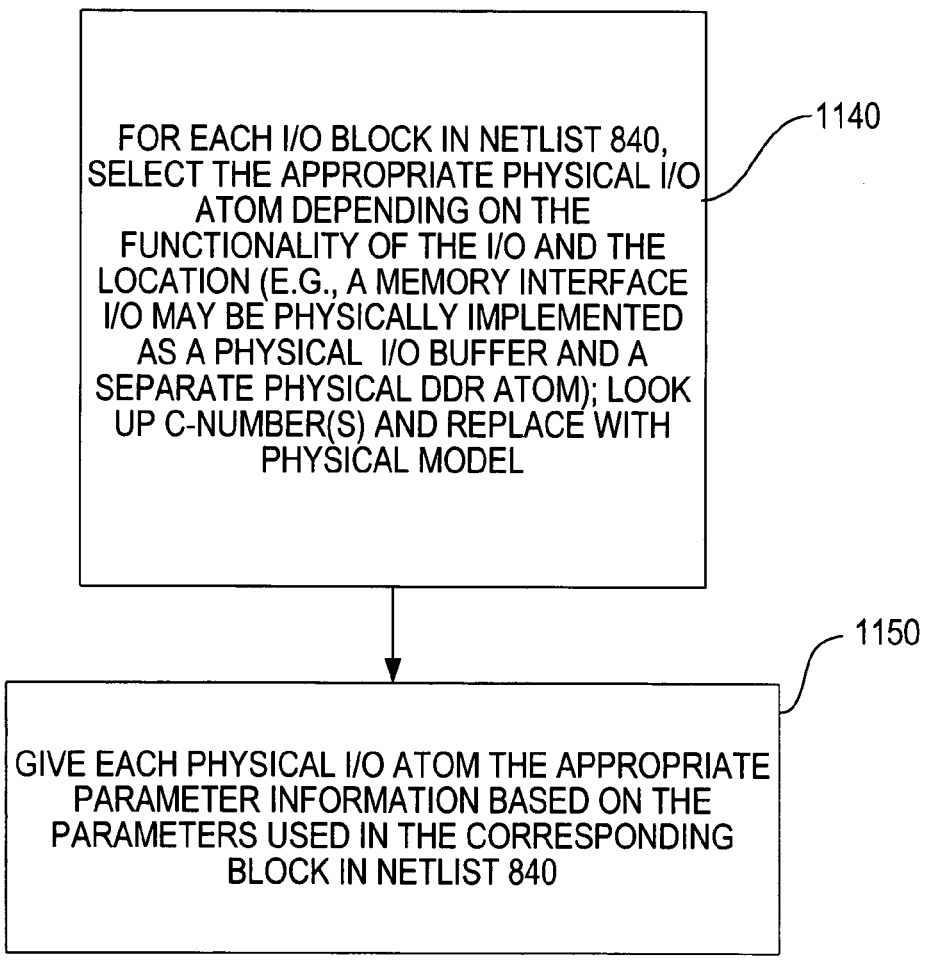
FIG. 11 is similar to FIG. 10 for other particular types of circuit blocks.
Figure 12:
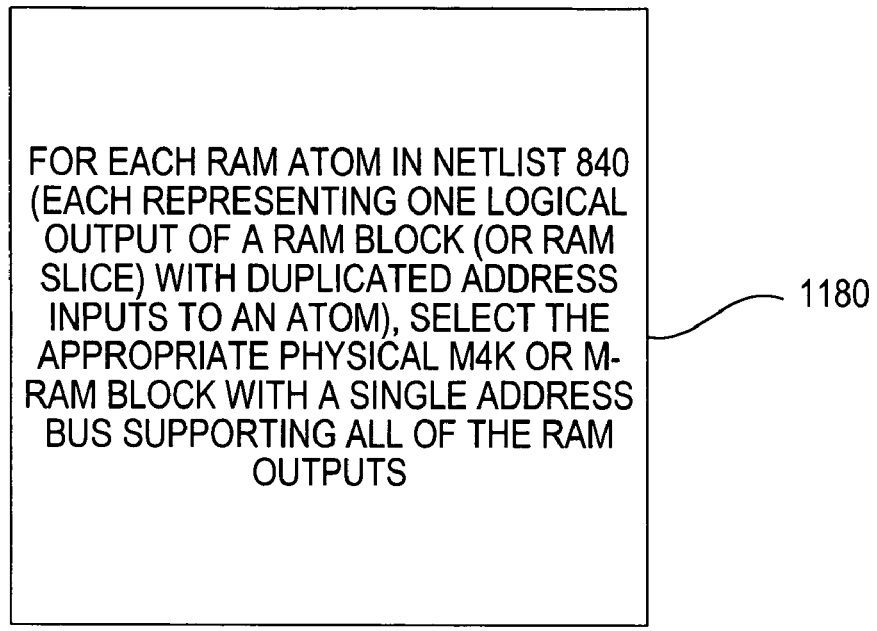
FIG. 12 is similar to FIGS. 10 and 11 for still other particular types of circuit blocks.

An illustrative embodiment of assembler flow element 850 is shown in FIG. 9. In step 1010, for each of the logical blocks in ASIC post-fit netlist 840, the appropriate physical block type is found. Then in step 1020 the parameters on the logical block (in netlist 840) are translated to the appropriate parameter values on the physical block. For example, FIG. 10 shows (in step 1110) how the above may be done in the case of CHLE logic blocks. In this case, the CHLE logic cells are directly mapped one-for-one from the logical netlist 840 to the physical netlist 860. The same representation can be used in both netlists. FIG. 11 is another example of performance of steps 1010 and 1020, in this case for I/O blocks. Step 1140 shows that I/O in netlist 840 are split into several physical I/O atoms, depending on the functionality of the I/O and the location. Then in step 1150, each of these physical I/O atoms is given the appropriate parameter information based on the parameters used in the original logical I/O atom. As step 1140 shows, for example, a memory interface I/O may be physically implemented as a physical I/O buffer and a separate physical DDR (double data rate) interface atom. FIG. 12 shows (in step 1180) still another example of the performance of above-described steps 1010 and 1020. In this case the example is for RAM. In step 1140 the mapping is from logical RAM atoms (each representing one logical output of a RAM block (or RAM slice) with duplicated address inputs to each atom) to a physical RAM block of an appropriate type (e.g., RAM of a type known as M4K, or RAM of a type known as M-RAM) with a single address bus supporting all of the RAM outputs. Step 1140 also illustrates how c-numbers are looked up for inclusion in netlist 860.

Returning to FIG. 9, all of the blocks in netlist 840 are transformed as per steps 1010 and 1020. Step 1030 is then performed to generate a structural verilog netlist that captures the results of these transformations. Lastly, step 1040 is performed to add placement, routing, and timing constraints. For example, the routing portion of step 1040 may involve making appropriate translations to move connections from logical ports in netlist 840 to the appropriate physical ports in netlist 860. The final result is handoff design files 860.

Figure 13:
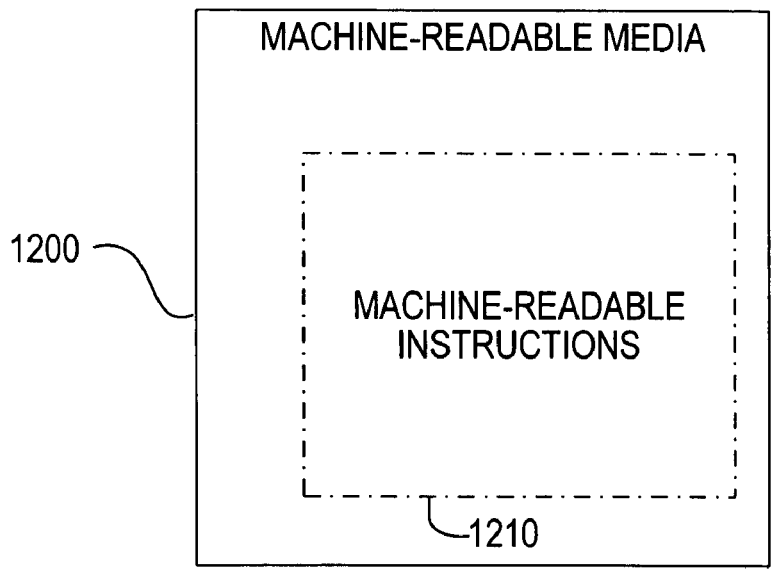
FIG. 13 is a simplified block diagram of illustrative machine-readable media in accordance with a possible aspect of the invention.

FIG. 13 illustrates another possible aspect of the invention. This is machine-readable media 1200 (e.g., magnetic disc(s), optical disc(s), magnetic tape(s), or the like) encoded with machine-readable instructions 1210 (e.g., a computer program) for at least partly performing one or more methods in accordance with the invention.

It will be understood that the foregoing is only illustrative of the principles of the invention, and that various modifications can be made by those skilled in the art without departing from the scope and spirit of the invention. For example, the ALE and HLE constructions shown herein are only illustrative, and other constructions can be used instead if desired.

The invention claimed is:

1. A method of producing information for specifying a configuration of a structured ASIC that will be functionally equivalent to a programmed FPGA performing a user's logic design, the structured ASIC including multiple identical instances of a mask-programmable module for use in implementing at least part of the user's logic design, the FPGA including multiple identical instances of a field-programmable module for use in implementing at least said part of the user's logic design, and each of the field-programmable modules having maximum logic capability that is greater than a maximum logic capability of one of the mask-programmable modules, the method comprising:

synthesizing the user's logic design to produce a netlist that is suitable for implementing the user's logic design in the FPGA without specifying full place and route information for the FPGA implementation, the netlist including a synthesis of each of multiple portions of the user's logic design for implementation by a respective one instance of the field-programmable module;

converting the netlist that results from the synthesizing to a modified netlist that is suitable for structured ASIC implementation of the user's logic design, the modified netlist including a conversion of the netlist for each of said portions of the user's logic design for implementation by a respective number of instances of the mask-programmable module, which number is different for at least some different ones of said portions of the user's logic design;

performing a place and route operation on the modified netlist to produce a further synthesis adapted for placement on the structured ASIC; and further converting the further synthesis to a specification for the structured ASIC that includes identifications of physical circuits that are to be used in producing the structured ASIC.

2. The method defined in claim 1 wherein the performing includes making a change in the modified netlist, and wherein the method further comprises:

feeding the change back to modify the user's logic design.

3. The method defined in claim 2 wherein the change comprises:

duplicating a register.

4. The method defined in claim 2 wherein the change comprises:

shifting a register.

5. The method defined in claim 1 further comprising:

performing a further place and route operation on the netlist that results from the synthesizing, the further place and route operation producing a still further synthesis adapted for placement on the FPGA.

6. The method defined in claim 5 wherein the performing a further place and route operation includes making a change in the netlist that results from the synthesizing, and wherein the method further comprises:

feeding the change back to modify the user's logic design.

7. The method defined in claim 5 further comprising:

comparing the further synthesis and the still further synthesis to test for functional equivalence.

8. A method of producing information for specifying a configuration of a structured ASIC that will be functionally equivalent to a programmed FPGA performing a user's logic design comprising:

synthesizing the user's logic design for implementation in the FPGA;

converting a synthesis that results from the synthesizing to a modified synthesis that is suitable for structured ASIC implementation;

performing a place and route operation on the modified synthesis to produce a further synthesis adapted for placement on a structured ASIC;

further converting the further synthesis to a specification for the structured ASIC that includes identifications of physical circuits that are to be used in producing the structured ASIC;

performing a further place and route operation on a synthesis that results from synthesizing the user's logic design for implementation in the FPGA, the further place and route operation producing a still further synthesis adapted for placement on the FPGA; and comparing the further synthesis and the still further synthesis to test for functional equivalence;

wherein the comparing comprises:

matching corresponding nodes in the further synthesis and the still further synthesis;

constructing BDDs of logic between nodes, identified in the matching, in each of the further synthesis and the still further synthesis; and testing, for functional equivalence, corresponding BDDs in the further synthesis and the still further synthesis.

9. The method defined in claim 8 wherein the nodes include registers, non-logic block inputs and outputs, and logic cell outputs in the still further synthesis and corresponding logic outputs in the further synthesis.

10. The method defined in claim 7 wherein the comparing comprises:

identifying corresponding non-logic blocks in the further synthesis and the still further synthesis; and testing, for similarity, functional parameter information for each of the corresponding non-logic blocks.

11. Machine-readable media encoded with machine-readable instructions for performing the method defined in claim 1.

12. A method of implementing a logic design in a structured ASIC, for which a functionally equivalent FPGA can be made, the structured ASIC including multiple identical instances of a mask-programmable module for use in implementing at least part of the logic design, the FPGA including multiple identical instances of a field-programmable module for use in implementing at least said part of the logic design, and each of the field-programmable modules having maximum logic capability that is greater than a maximum logic capability of one of the mask-programmable modules, the method comprising:

producing an FPGA netlist of the logic design, which FPGA netlist does not include full place and route information for an FPGA implementation of the logic design, the FPGA netlist including a synthesis of each of multiple portions of the logic design for implementation by a respective one instance of the field-programmable module;

converting the FPGA netlist to a structured ASIC netlist, the structured ASIC netlist including a conversion of the FPGA netlist for each of said portions of the logic design for implementation by a respective number of instances of the mask-programmable module, which number is different for at least some different ones of said portions of the logic design;

performing a place and route operation on the structured ASIC netlist to produce a further synthesis adapted for placement on a structured ASIC; and converting the further synthesis to a specification for the structured ASIC that includes identifications of physical circuits that are to be used in producing the structured ASIC.

* * * * *